US008000282B2

(12) United States Patent
Chindapol et al.

(10) Patent No.: US 8,000,282 B2
(45) Date of Patent: Aug. 16, 2011

(54) COOPERATIVE RELAYING USING DIRTY PAPER CODING

(75) Inventors: Aik Chindapol, Washington, DC (US); Jimmy Chui, Princeton, NJ (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 858 days.

(21) Appl. No.: 11/952,229

(22) Filed: Dec. 7, 2007

(65) Prior Publication Data
US 2008/0141079 A1   Jun. 12, 2008

Related U.S. Application Data (60) Provisional application No. 60/873,325, filed on Dec. 7, 2006, provisional application No. 60/855,929, filed on Jan. 22, 2007.

(51) Int. Cl.
*H04B 1/7097* (2006.01)
(52) U.S. Cl. .... 370/315; 370/492; 455/11.1; 455/114.2; 455/296
(58) Field of Classification Search .................. 370/315, 370/316, 328, 492; 455/11.1, 15, 63.1, 114.2, 455/278.1, 492, 296; 375/346, 348; 714/48, 714/799
See application file for complete search history.

(56) References Cited

U.S. PATENT DOCUMENTS

| 7,778,598 | B2 * | 8/2010 | Devroye et al. ............ 455/13.4 |
| 7,984,356 | | 7/2011 | Chindapol | |
| 2003/0104784 | A1 * | 6/2003 | Foschini et al. .................. 455/63 |
| 2003/0104808 | A1 * | 6/2003 | Foschini et al. ............... 455/423 |
| 2006/0210070 | A1 * | 9/2006 | Reznik et al. .................... 380/33 |
| 2006/0251175 | A1 * | 11/2006 | Reznik et al. ............. 375/240.24 |
| 2007/0079742 | A1 * | 4/2007 | Liu et al. ................... 114/102.1 |
| 2007/0217522 | A1 * | 9/2007 | Sun et al. ...................... 375/242 |
| 2008/0068979 | A1 | 3/2008 | Visotsky et al. | |
| 2008/0282126 | A1 | 11/2008 | Chindapol et al. | |
| 2008/0285499 | A1 | 11/2008 | Zhang et al. | |

OTHER PUBLICATIONS

Non-Final Office Action for U.S. Appl. No. 12/039,726, mailed on Nov. 24, 2010, 16 pages.
Chindapol, Aik, et al., "DL Hybrid-ARQ Protocol in Multi-Hop System", Invention Disclosure, Feb. 28, 2007, pp. 1-6.
Chindapol, Aik, et al., "Relay Assisted HARQ", IEEE 802.16 Broadband Wireless Access Working Group, IEEE C802.16j-06/266r1, Siemens, Nov. 15, 2006, 5 pages.
Herhold, Patrick, et al., "A simple cooperative extension to wireless relaying", International Zurich on communications, IEEE, Feb. 2004, pp. 36-39.

(Continued)

*Primary Examiner* — Hassan Phillips
*Assistant Examiner* — Duc T Duong
(74) *Attorney, Agent, or Firm* — Brake Hughes Bellermann LLP (57) ABSTRACT

A method for transmitting a signal in a wireless network includes sending a first signal from a first source to a first intermediate station. A second signal is sent from a second source to a second intermediate station. The first signal is additionally received by the second intermediate station. The second signal is encoded according to dirty paper coding (DPC) such that the first signal does not interfere with the transmission of the second signal. The first signal is sent from the first intermediate station to a first destination and simultaneously, the DPC encoded second signal is sent from the second intermediate station to a second destination.

22 Claims, 4 Drawing Sheets

OTHER PUBLICATIONS

Herhold, Patrick, et al., "Cooperative multi-hop transmission in wireless networks", Selected Papers from the European Wireless 2004 Conference, Computer Networks, vol. 49, Issue 3, Jun. 1, 2005, pp. 299-324.

Lin, Shu, et al., "Automatic Repeat-Request Error Control Schemes", IEEE Communication Magazine, vol. 12, No. 12, Dec. 1984, pp. 5-17.

Lundqvist, Henrik, et al., "TCP with End-to-End Forward Error Correction", Technical Report, Royal Institute of Technology, 2004, 4 pages.

Nonnenmacher, Jorg, et al., "Parity-Based Loss Recovery for Reliable Multicast Transmission", ACM SIGCOMM Computer Communication Review, vol. 27, Oct. 1997, pp. 1-21.

Svga, Junichi, et al., "DL HARQ Method for User Transparent Relaying", IEEE 802.16 Broadband Wireless Access Working Group, IEEE C802.16j-06/126r2, Nov. 16, 2006, 10 pages.

Suga, Junichi, et al., "DL HARQ with Relays", EEE 802.16 Broadband Wireless Access Working Group, IEEE C802.16j-07/002r3, Jan. 18, 2007, 7 pages.

Zheng, Haihong, et al., "HARQ with Relays", IEEE 802.16 Presentation Submission Template (Rev. 8.3), IEEE C802.16j-06/197r1, Nov. 7, 2006, 12 pages.

Non-Final Office Action Response for U.S. Appl. No. 12/039,726, filed Feb. 24, 2011, 15 pages.

Notice of Allowance for U.S. Appl. No. 12/039,726, mailed on Mar. 28, 2011, 8 pages.

* cited by examiner

COOPERATIVE RELAYING USING DIRTY PAPER CODING

CROSS-REFERENCE TO RELATED APPLICATION

The present application is based on provisional application Ser. No. 60/873,325 filed on Dec. 7, 2006 and provisional application Ser. No. 60/885,929, filed Jan. 22, 2007, the entire contents of which are herein incorporated by reference.

BACKGROUND OF THE INVENTION

1. Technical Field

The present disclosure relates to cooperative relaying and, more specifically, to cooperative relaying using dirty paper coding.

2. Discussion of the Related Art

Wireless communication is an important field of technical development. Wireless communication relates not only to mobile wireless telecommunications networks such as GSM and CDMA cell phone networks, but also to wireless computer networks such as IEEE 802.11 Wifi and IEEE 802.16 Wireless Metropolitan Area Networks (MAN) also known as WiMAX.

Of these networks, WiMAX offers the promise of an effective mean of delivering next-generation network access to both general purpose computers and communications appliances without having to build an extensive copper wire or fiber-optic cable infrastructure into homes and offices. Moreover, in addition to providing "last mile" fixed broadband access, WiMAX standards such as IEEE 802.16e provide for network access to mobile terminals that may roam within the coverage area of network base stations.

In such mobile WiMAX networks, a plurality of base stations deliver network access to one or more mobile terminals within their coverage area.

Mobile WiMAX networks may be able to provide network access to mobile terminals for telecommunication and/or arbitrary data transfer such as a connection to the Internet.

To extend the coverage area of a base station and/or to improve signal strength within poorly covered portions of the coverage area, one or more relay stations may be used. A relay station can range from a simple repeater that listens for and rebroadcasts communications signals without regard to the intended destination of the communications signals to a sophisticated station that listens, processes, modifies and retransmits signals to the intended destination. Accordingly, a plurality of base stations, each of which may have one or more relay stations within its coverage area, may work together to provide mobile wireless network access across a broad area.

While conventional wireless networks including cellular networks and WiMAX networks employing conventional relay stations may be able to provide network access, there is a continuing need to provide more reliable network access over a greater coverage area while maximizing efficiency of bandwidth.

SUMMARY

A method for transmitting a signal in a wireless network includes sending a first signal from a first source to a first intermediate station. A second signal is sent from a second source to a second intermediate station. The first signal is additionally received by the second intermediate station. The second signal is encoded according to dirty paper coding (DPC) such that the first signal does not interfere with the transmission of the second signal. The first signal is sent from the first intermediate station to a first destination and simultaneously, the DPC encoded second signal is sent from the second intermediate station to a second destination.

In encoding the second signal according to DPC, the first signal may be taken as known interference.

The first source may be a first mobile terminal, the second source may be a second mobile terminal and the second destination may be a base station. The first and second intermediate stations may be relay stations. The first source may be a first base station, the second source may be a second base station and the second destination may be a mobile terminal.

Prior to performing DPC encoding, the second signal may be encoded according to an error correction coding scheme to protect the second signal from transmission error. The error correction scheme may be a low-density parity-check code (LDPC). The error correction scheme may use turbo codes, block codes or convolutional codes.

The combined first signal and the DPC encoded second signal may be received and DPC demodulation may be performed on the received signals to reproduce the second signal. Error correction decoding may be performed on the DPC demodulated signal to reproduce the second signal.

The wireless network may be a cellular network or an IEEE 802.16 network.

DPC encoding may be performed on a codeword-by-codeword basis or on a symbol-by-symbol basis.

The output of DPC encoding may be calculated according to the equation:

$$x_i = [c_i - \alpha s_i] \bmod A$$

where $x_i$ is the i-th output symbol, $c_i$ is the i-th second signal symbol, $s_i$ is the i-th first signal symbol, $\alpha$ is based on the signal-to-noise ratio, and A the modulus.

A system for transmitting a signal in a wireless network includes a first intermediate station for receiving a first signal and sending the first signal to a first destination, and a second intermediate station for receiving a second signal and sending the second signal to a second destination simultaneously with the sending of the first signal to the first destination by the first intermediate station. The second intermediate station additionally receives the first signal. The second intermediate station includes a dirty paper coding (DPC) encoder for encoding the second signal according to DPC, prior to sending the second signal to the second destination, such that the first signal does not interfere with the second signal.

The DPC encoder may take the first signal as known interference with respect to the second signal.

The first intermediate station may receive the first signal from a first source and the second intermediate station may receive the second signal from a second source.

The first source may be a first mobile terminal, the second source may be a second mobile terminal and the second destination may be a base station. The first and second intermediate stations may be relay stations.

The second intermediate station may additionally include an error correction encoder for encoding the second signal according to an error correction coding scheme prior to encoding the second signal by the DPC encoder.

A computer system includes a processor and a program storage device readable by the computer system, embodying a program of instructions executable by the processor to perform method steps for transmitting a signal in a wireless network. The method includes receiving, in an intermediate station, a first signal from a first source and a second signal form a second source. The second signal is encoded according to dirty paper coding (DPC) such that the first signal does not interfere with the second signal. The DPC encoded second signal is sent from the intermediate station to a second destination as another intermediate station simultaneously sends the first signal to a first destination.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Signal interference may occur when multiple signals are transmitted at approximately the same time. To reduce signal interference, signals may be spatially separated, separated in time, use different frequencies, use different codes, etc.

Many of these methods for reducing interference by separating the multiple signals may come at the cost of reduced transmission rate performance.

Exemplary embodiments of the present invention provide systems and methods for increasing transmission rates and system performance in wireless networks by allowing a plurality of transmission stations to act cooperatively to simultaneously transmit a signal to a receiving station while minimizing the opportunity for interference.

As used herein, the term "simultaneously" may refer to multiple signals that are transmitted and/or received at nearly the same time, at nearly the same frequency, at nearly the same location, using the same codes, or otherwise overlap in one or more of these characteristics. Accordingly, two signals that are said to be transmitted and/or received simultaneously are normally prone to interference.

Examples of wireless networks that may be used with exemplary embodiments of the present invention include the aforementioned cellular networks and IEEE 802.16e networks. Other wireless networks may also benefit from the system and methods herein disclosed, for example another form of OFDMA-based wireless network may be used.

Figure 1:
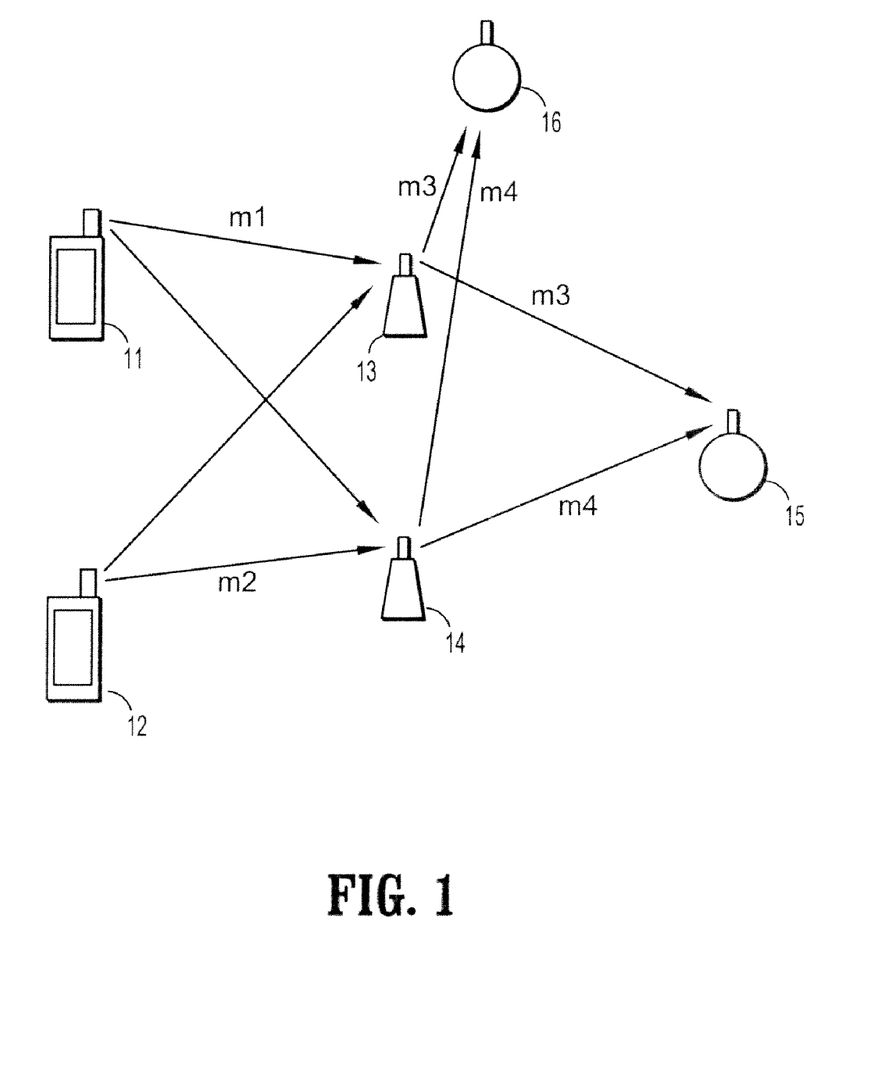
FIG. 1 shows a diagram illustrating a wireless network with multiple intermediate stations, for example, relay stations, that may implement an exemplary embodiment of the present invention.

FIG. 1 is a diagram illustrating a wireless network with multiple relay stations that may implement an exemplary embodiment of the present invention. This example features a two-hop relay system where a given signal passes from source to relay and then from relay to destination. The exemplary embodiments discussed herein may be readily applicable to relay systems including more than two-hops. There is a first transmission source 11 and a second transmission source 12. These transmission sources 11 and 12 may be any form of transmitting station including, but not limited to, mobile telephones, computers, base stations, relay stations, etc. In addition, these transmission sources 11 and 12 may include wireless connections, wired connections and/or other forms of connections. Many of the techniques as described herein are directed to aiding reception by a single destination 15. However, there may be additional destinations such as destination 16 that exist in the system and may communicate in a conventional manner.

The destinations 15 and 16 may be any sort of receiving station including, but not limited to, a mobile telephone, a computer, a base station, a relay station, etc. Likewise, the relay station may similarly be any sort of intermediate station including, but not limited to, a mobile telephone, a computer, a base station, a relay station, etc.

A single device may be, at some times, a transmitting station and, at other times, a receiving station. For example, a mobile telephone may both send and receive communications signals and thus may at times be a transmission source and at times be a destination.

Exemplary embodiments of the present invention may thus be applied to communications on the uplink (as a mobile station sends a message to a base station) and on the downlink (as a base station sends a message to a mobile station) by changing which stations are considered source and destination.

In the exemplary embodiment illustrated in FIG. 1, two relay stations 13 and 14 are shown, however, it is to be understood that exemplary embodiments of the present invention may be applied to any number of relay stations. The relay stations may function in cooperation with one another to simultaneously transmit a first signal m1 from the first source 11 and a second signal m2 from the second source 12, to the destination 15 using one or more dirty paper coding techniques.

Exemplary techniques for dirty paper coding are described in M. Costa, "Writing on dirty paper," *IEEE Trans. Inform. Theory*, vol. 29, no. 3, pp. 439-441, May 1983; and C. B. Peel, "On 'dirty-paper coding'," *IEEE Signal Processing Magazine*, pp. 112-113, May 2003; both of which are incorporated by reference.

Dirty paper coding takes its name from the understanding that a hand-written message may be legibly written by carefully forming words such that the recognizable features of the letters are not obstructed by the dirty marks on the paper.

In signal transmission, dirty paper coding relates to the modification of a signal to be transmitted to account for a known source of interference. In one simple example of dirty paper coding, where interference is known to be I, a signal to be transmitted m may be modified prior to transmission, for example, to become m−I. Thus when subjected to the interference I, the signal is received as (m−I)+I or simply m.

This example is a simplified explanation of dirty paper coding. In practice, there are more effective methods for modifying the signal to be transmitted than simply subtracting out the known measure of interference. Examples of these techniques are presented in the references cited above. Moreover, there may be a component of unknown noise that is present in the communication channel in addition to the known interference. To better protect the communication signal from the unknown noise and/or the noise arising from dirty paper coding, the message signal may be encoded to protect integrity prior to being modified to accommodate the known interference. Examples of such encoding are described in greater detail below.

Again referring to the example shown in FIG. 1, the first source 11 may transmit a first signal m1 to the first relay station 13. The second source 12 may transmit a second signal m2 to the second relay station 14. The signals m1 and m2 may be sent during different time intervals and/or with different frequency or codes to minimize interference. Because of the broadcast nature of the wireless medium, the first relay station 13 may additionally listen to and decode the second signal m2 and the second relay station 14 may additionally listen to and decode the first signal m1.

Dirty paper coding may then be performed by one or more of the relay stations as they relay the first and second messages to the destination station 15. According to one exemplary embodiment, the first relay station 13 may send the first signal m1, in the form of a third signal m3, to the destination 16 in a conventional manner. The signal m1 may further be encoded by the relay station 13 to protect transmission integrity and thus the signal m3 may represent such an encoded version of m1.

Similarly, the second relay station 14 may send an encoded version of m2 encoded according to one or more of the techniques discussed below and this encoded version of m2 may be represented as m4.

To maximize the utilization of the wireless medium, the relay stations 13 and 14 may transmit the signals m3 and m4 to their respective destinations 15 and 16 simultaneously. Due to the broadcast nature of wireless medium, the signal m3 transmitted from the relay station 13 may be considered as interference at the destination 15, which might not be the intended destination of the signal m3. Thus, from the point of view of the second relay station 14, the signal m1 sent by the first relay station 13 may be considered a known interference. Using one or more dirty paper coding techniques, the second relay station 14 may then encode the signal m2 to accommodate the known interference of m1. In the simple example discussed above, the encoded signal m4 may equal m2-m1. The signal m4 may also be encoded to protect transmission integrity as discussed in greater detail below.

Moreover, in modifying the signal m2 to accommodate the known interference of m1, the channel gain and/or other channel characteristics of the path between the first relay station 13 and the destination 15 may be known and factored into the calculation for m4. By knowing both this channel gain and the m1 signal, dirty paper coding may be successfully applied to the signal m2.

Because the second relay station 14 receives m1 from the first source 11, the second relay station 14 is able to prepare the signal m4 to offset interference from m1.

In the example discussed above, the second relay station 14 accepts responsibility for configuring its transmission signal to accommodate the interference caused by the first relay station's transmission signal. Responsibility for implementing dirty paper coding may have alternatively fallen to the first relay station 13. The decision of which relay station is to take responsibility for implementing dirty paper coding may be provided by a network control entity such as base station or may be determined based on policy criteria known to both relay stations.

At the destination 15, the combined signal of m3 and m4 is received. This signal may be decoded with similar or nearly identical performance to a situation where only one signal is received from one source and decoded without interference. For example, a decoder at the destination may first decode m3+m4 by using dirty paper decoding. This may result in the determination of the signal m2.

At the destination 16, the combined signal of m3 and m4 is also received. As DPC coding has not been performed at the relay station 13, the signal m4 may cause interference in decoding the signal m3, which is a relayed version of the signal m1. With careful network planning, for example, placing the destination 16 far away from the relay station 14 to increase spatial separation of the two signals m3 and m4, the amount of interference caused by the signal m4 being received at destination 16 may be reduced allowing the signal m3 to be decoded with higher probability of success.

Where the destination 16 is a base station, these considerations may factor into the placement of base stations. Where the destination 16 is a mobile terminal, these considerations may factor into the determination of whether to perform dirty paper coding.

In one special case of the example illustrated in FIG. 1, source stations 11 and 12 may be mobile stations within a mobile wireless network, the relay station 13 and 14 may be mobile wireless network repeaters, and the destination 15 may be a network base station. In such a case, dirty paper coding, as applied above, may be provided on the uplink.

Figure 2:
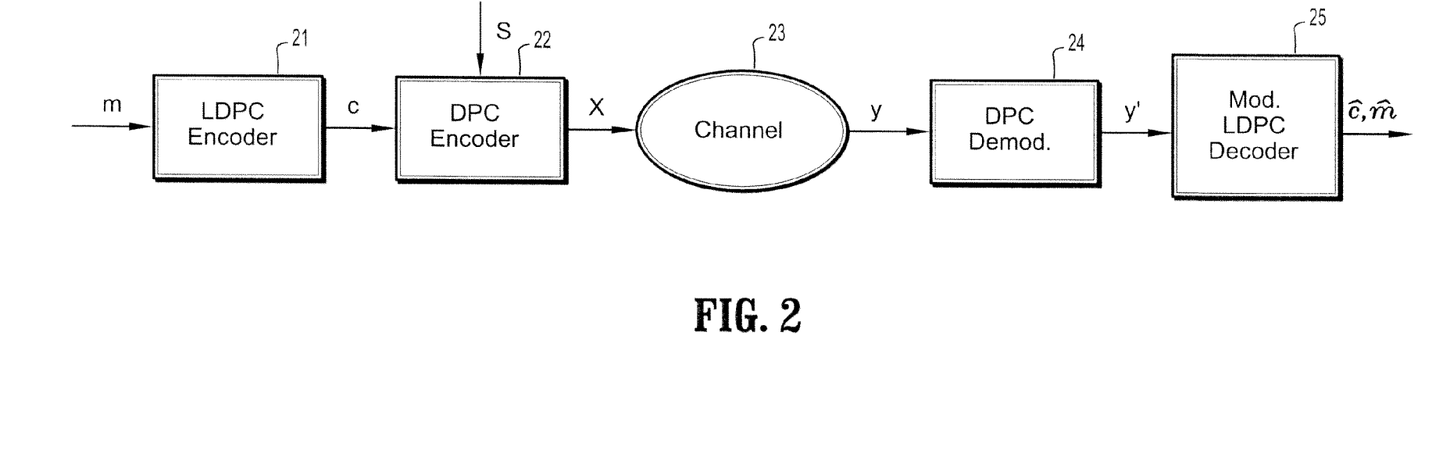
FIG. 2 is a diagram showing a system for simultaneously transmitting multiple messages from a plurality of relay stations cooperating to perform dirty paper coding according to an exemplary embodiment of the present invention.

As discussed above, multiple relay stations may cooperate to simultaneously transmit messages to one or more destinations, with one or more of the relay stations performing dirty paper coding to accommodate the known signal of the other one or more relay stations. FIG. 2 is a diagram showing a system for such a transmission according to an exemplary embodiment of the present invention and FIG. 3 is a flow chart showing a method for such a transmission.

Figure 3:
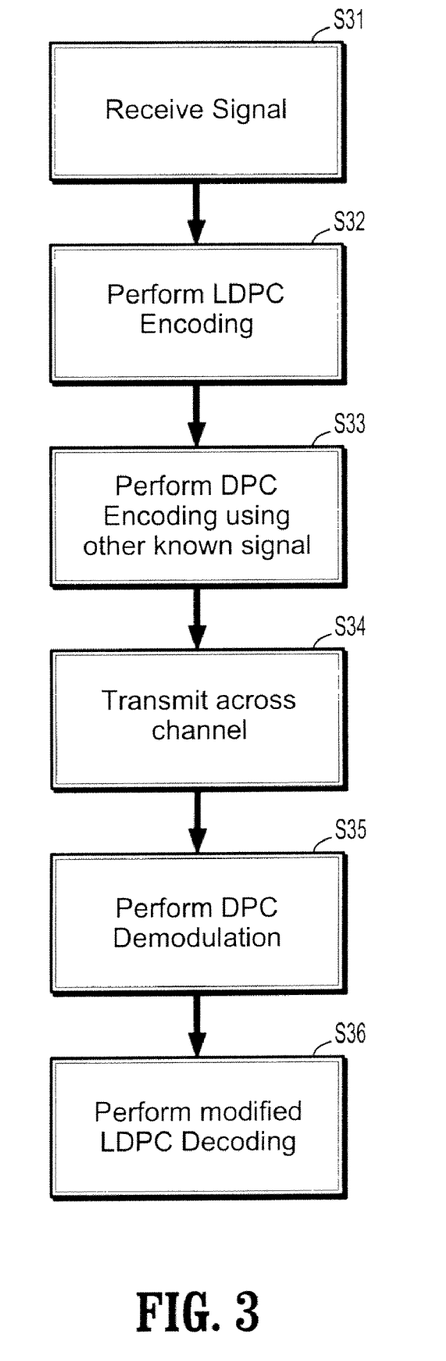
FIG. 3 is a flow chart illustrating a method for simultaneously transmitting multiple messages from a plurality of relay stations cooperating to perform dirty paper coding according to an exemplary embodiment of the present invention.

With respect to FIGS. 2 and 3, a relay station with responsibility for performing dirty paper coding may receive a message m (Step S31). The message may be a message from one of multiple sources. The message m may then be encoded to protect the integrity of the message, for example, using a low-density parity-check code (LDPC) encoder 21 for performing LDPC encoding (Step S32).

LDPC is an example of an error correction code that may be used to transmit a message over a noisy channel. When encoded using an LDPC encoder, a transmitted signal includes redundancy that may facilitate error correction.

LDPC encoding may result in a codeword c. Dirty paper coding (DPC) may then be performed on the codeword c by a DPC encoder 22 using the known other signals s as the known interference (Step S33). Thus, dirty paper coding may be performed on a codeword-by-codeword basis.

The resulting signal x may then be transmitted across the channel 23 (Step S34). At the destination, the signal is received as y. DPC demodulation may then be performed (Step S35) by a DPC demodulator 24. The DPC demodulated signal y' may then be decoded by performing a modified LDPC decoding (Step S36) by a modified LDPC decoder 25. Modified LDPC decoding may result in a determined encoded signal $\hat{c}$ and a determined signal $\hat{m}$ which may be used to determine the original messages sent by the source stations, even when the channel contains noise that cannot be accounted for. The DPC demodulator 24 and LDPC decoder 25 may be combined to form a joint demodulator and decoder for performing steps S35 and S36.

Exemplary embodiments of the present invention may utilize a special subset of dirty paper coding known as dirty tape coding to use multiple relay stations to cooperatively send signals over a wireless network. According to this approach, a non-dithered dirty tape coding is used. Examples of such techniques may be found, for example, in U. Erez and S. ten Brink, "A close-to-capacity dirty paper coding scheme,"

IEEE Trans. Inform. Theory, vol. 51, pp. 3417-3432, October 2005, which is incorporated by reference.

Dirty tape coding may operate under the same principal of dirty paper coding; specifically, as applied herein, one relay station may cooperate with another relay station by characterizing the signal of the other relay station as known interference when encoding its message. However, in dirty tape coding, coding is performed on a symbol-by-symbol bases as opposed to a codeword-by-codeword basis as is done in dirty paper coding. While symbol-by-symbol coding may slightly degrade performance, coding and decoding algorithms may be significantly simplified.

As is the case above with respect to dirty paper coding, dirty tape coding may be performed on signals that have been encoded with error correction. For example, binary LDPCs, non-binary LDPCs, turbo codes, block codes, convolutional codes, trellis codes, etc., may be used. However, the examples described herein are described as using binary LDPCs for explanatory purposes.

In LDPC encoding, an information vector of length k bits is input into the LDPC encoder. The LDPC encoder outputs a codeword of length n bits. The bits may be combined to form a string of symbols, for example, under a PAM constellation (e.g. 4-PAM or 8-PAM). The symbols may be left in binary phase-shifting keying (BPSK) form.

In DTC encoding, the DTC encoder may process data on a symbol-by-symbol basis. The encoder may take in two symbols: $c_i$ (the symbol from the codeword) and $s_i$ (the symbol from the known interference. The calculation of its output $x_i$, may be given by:

$$x_i = [c_i - \alpha s_i] \bmod A \quad (1)$$

The constant $\alpha$ is based on the signal-to-noise ratio (SNR) attributable to the unknown channel noise:

$$\alpha = \frac{SNR}{1+SNR} = \frac{P}{P+N} \quad (2)$$

The modulus A may be given by:

$$A = \sqrt{12P} \quad (3)$$

The modulo operation range may be defined as $$\left[-\frac{A}{2}, \frac{A}{2}\right].$$

The sequence of $x_i$ may be transmitted through the transmission channel. At the receiving end of the channel, the corresponding received symbol may be $y_i = h(x_i + s_i) + z_i$.

After the signal is received, dirty tape demodulation may be performed. During this step, the demodulation module may perform the following computation:

$$y'_i = [\alpha y_i / h] \bmod A \quad (4)$$

After dirty tape demodulation, modified LDPC decoding may be performed. In this step, the input probabilities, which represent the signal reliability, are not calculated over the Euclidean distance metric, but rather may reflect the modulo-A distance metric. The modulo-A distance metric may be modified to suit different channel models. Once these probabilities have been computed, a standard LDPC decoder may be used. The distance metric may be: $\|y'-hx\|_A^2$, which may be used as input to a standard LDPC decoder. Again, the distance metric may be modified to fit the different decoding methods and channel coding schemes.

After modified LDPC decoding has been performed, the original message m2 may be known.

As discussed above, signal encoding, including both DPC encoding and LDPC encoding may be performed within a relay station. Accordingly, the relay station may include a computer system for performing encoding. The computer system may be a special purpose digital signal processor, for example, including a system-on-chip, or may be a general purpose computer for implementing encoding.

Figure 4:
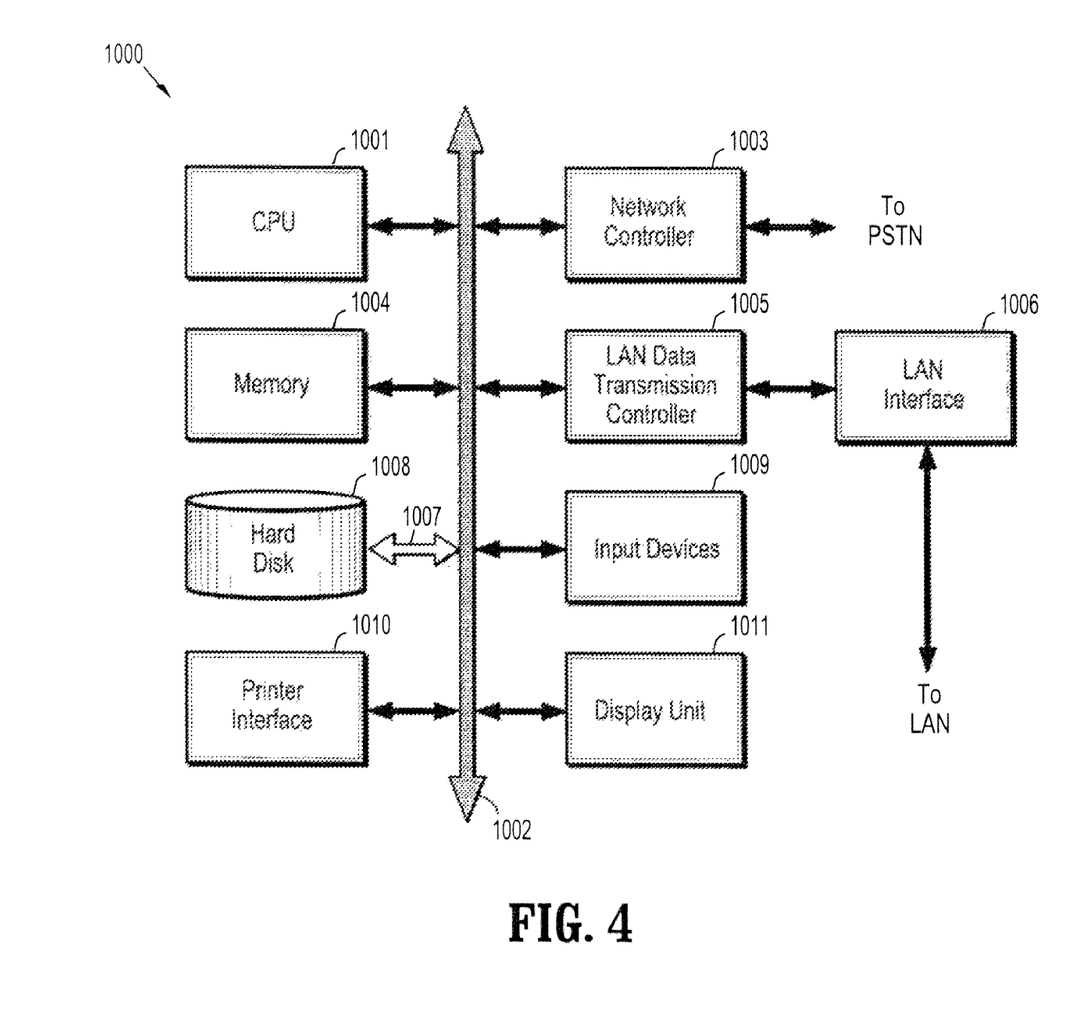
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a special purpose digital signal processor, a mainframe, personal computer (PC), handheld computer, server, etc. The software application may be stored on a recording media locally accessible by the computer system, for example one or more ROM chips. Alternatively, the recording medium may be accessible via a hard wired network or over the wireless network.

The computer system referred to generally as system 1000 may include, for example, one or more of a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. One or more of the included components of the computer system may be integrated on a single chip.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for transmitting a signal in a wireless network, comprising:
    sending a first signal from a first source to a first intermediate station;
    sending a second signal from a second source to a second intermediate station, wherein the first signal is additionally received by the second intermediate station;
    encoding the second signal, according to dirty paper coding (DPC) such that the first signal does not interfere with the transmission of the second signal; and
    sending the first signal from the first intermediate station to a first destination and simultaneously sending the DPC encoded second signal from the second intermediate station to a second destination.

2. The method of claim 1, wherein in encoding the second signal according to DPC, the first signal is taken as known interference.

3. The method of claim 1, wherein the first source is a first mobile terminal, the second source is a second mobile terminal and the second destination is a base station.

4. The method of claim 1, wherein the first and second intermediate stations are relay stations.

5. The method of claim 1, wherein the first source is a first base station, the second source is a second base station and the second destination is a mobile terminal.

6. The method of claim 1, wherein prior to performing DPC encoding, the second signal is encoded according to an error correction coding scheme to protect the second signal from transmission error.

7. The method of claim 6, wherein the error correction scheme is a low-density parity-check code (LDPC).

8. The method of claim 6, wherein the error correction scheme uses turbo codes, block codes or convolutional codes.

9. The method of claim 1, additionally including:
receiving the combined first signal and the DPC encoded second signal; and
performing DPC demodulation on the received signals to reproduce the second signal.

10. The method of claim 6, additionally including:
receiving the combined first signal and the DPC encoded second signal;
performing DPC demodulation on the received signals; and
performing error correction decoding on the DPC demodulated signal to reproduce the second signal.

11. The method of claim 1, wherein the wireless network is a cellular network.

12. The method of claim 1, wherein the wireless network is an IEEE 802.16 network.

13. The method of claim 1, wherein DPC encoding is performed on a codeword-by-codeword basis.

14. The method of claim 1, wherein DPC encoding is performed on a symbol-by- symbol basis.

15. The method of claim 14, wherein the output of DPC encoding is calculated according to the equation: $x_i=[c_i-\alpha s_i]$ mod A where $x_i$ is the i-th output symbol, $c_i$ is the i-th second signal symbol, $s_i$ is the i-th first signal symbol, $\alpha$ is based on the signal-to-noise ratio, and A the modulus.

16. A system for transmitting a signal in a wireless network, comprising:
a first intermediate station, including a processor, configured to receive a first signal and send the first signal to a first destination; and
a second intermediate station, including a processor, configured to receive a second signal and to send the second signal to a second destination simultaneously with the sending of the first signal to the first destination by the first intermediate station, wherein the second intermediate station additionally receives the first signal;
wherein the second intermediate station includes a dirty paper coding (DPC) encoder configured to encode the second signal according to DPC, prior to sending the second signal to the second destination, such that the first signal does not interfere with the second signal.

17. The system of claim 16, wherein the DPC encoder is configured to take the first signal as known interference with respect to the second signal.

18. The system of claim 16, wherein the first intermediate station is configured to receive the first signal from a first source and the second intermediate station is configured to receive the second signal from a second source.

19. The system of claim 18, wherein the first source is a first mobile terminal, the second source is a second mobile terminal and the second destination is a base station.

20. The system of claim 16, wherein the first and second intermediate stations are relay stations.

21. The system of claim 16, wherein the second intermediate station additionally includes an error correction encoder configured to encode the second signal according to an error correction coding scheme prior to encoding the second signal by the DPC encoder.

22. A computer program product tangibly embodied on a non-transitory computer-readable storage medium having executable-instructions stored thereon, the instructions being executable to cause a computer of an intermediate station to:
receive by the intermediate station in a wireless network, a first signal from a first source and a second signal form a second source;
encode by the intermediate station the second signal according to dirty paper coding (DPC) such that the first signal does not interfere with the second signal; and
sending send the DPC encoded second signal from the intermediate station to a second destination as another intermediate station simultaneously sends the first signal to a first destination.

* * * * *

UNITED STATES PATENT AND TRADEMARK OFFICE
CERTIFICATE OF CORRECTION

| | | |
|---|---|---|
| PATENT NO. | : 8,000,282 B2 | Page 1 of 1 |
| APPLICATION NO. | : 11/952229 | |
| DATED | : August 16, 2011 | |
| INVENTOR(S) | : Aik Chindapol et al. | |

It is certified that error appears in the above-identified patent and that said Letters Patent is hereby corrected as shown below:

In the Claims:

In column 9, line 28, in claim 14, delete "symbol-by- symbol" and insert -- symbol-by-symbol --, therefor.

In column 10, line 36, in claim 22, before "send" delete "sending".

Signed and Sealed this
Eighteenth Day of October, 2011

David J. Kappos
*Director of the United States Patent and Trademark Office*